(12) United States Patent
Schnebly et al.

(10) Patent No.: US 8,237,780 B2
(45) Date of Patent: Aug. 7, 2012

(54) METHOD AND APPARATUS FOR 3D VIEWING

(75) Inventors: Dexter A. Schnebly, Wichita, KS (US); Basil L. Sneeringer, Derby, KS (US)

(73) Assignee: The Boeing Company, Chicago, IL (US)

( * ) Notice: Subject to any disclaimer, the term of this patent is extended or adjusted under 35 U.S.C. 154(b) by 1315 days.

(21) Appl. No.: 11/926,880

(22) Filed: Oct. 29, 2007

(65) Prior Publication Data

US 2009/0109282 A1    Apr. 30, 2009

(51) Int. Cl.
H04N 9/47    (2006.01)
(52) U.S. Cl. .................. 348/55; 348/53; 348/58
(58) Field of Classification Search .................. 348/42, 348/51, 55, 56, E13.023, E13.04, E13.053, 348/E13.066, 53, 58
See application file for complete search history.

(56) References Cited

U.S. PATENT DOCUMENTS

| | | | | |
|---|---|---|---|---|
| 4,424,529 A | * | 1/1984 | Roese et al. | 348/56 |
| 4,588,259 A | * | 5/1986 | Sheiman | 359/465 |
| 4,991,005 A | * | 2/1991 | Smith | 348/77 |
| 5,541,641 A | * | 7/1996 | Shimada | 348/58 |
| 5,596,363 A | * | 1/1997 | Christian | 348/58 |
| 5,701,154 A | * | 12/1997 | Dasso | 348/42 |
| 5,717,412 A | * | 2/1998 | Edwards | 345/7 |
| 5,821,989 A | * | 10/1998 | Lazzaro et al. | 348/56 |
| 6,057,811 A | | 5/2000 | Edwards | |
| 6,088,052 A | * | 7/2000 | Guralnick | 348/51 |
| 6,346,929 B1 | * | 2/2002 | Fukushima et al. | 345/8 |
| 2001/0028413 A1 | | 10/2001 | Tropper | |
| 2001/0038491 A1 | * | 11/2001 | Fergason | 359/466 |
| 2004/0056948 A1 | * | 3/2004 | Gibson | 348/56 |
| 2004/0212612 A1 | * | 10/2004 | Epstein et al. | 345/419 |
| 2005/0037843 A1 | * | 2/2005 | Wells et al. | 463/30 |
| 2005/0225630 A1 | * | 10/2005 | Childers et al. | 348/51 |
| 2005/0264651 A1 | * | 12/2005 | Saishu et al. | 348/51 |
| 2006/0061651 A1 | * | 3/2006 | Tetterington | 348/51 |
| 2006/0268105 A1 | * | 11/2006 | Jacobs et al. | 348/53 |
| 2008/0055541 A1 | * | 3/2008 | Coulter et al. | 351/169 |
| 2009/0055654 A1 | * | 2/2009 | Dunn et al. | 713/182 |

OTHER PUBLICATIONS

Extended European Search Report dated Oct. 11, 2011 in European Patent Application No. 08167882.3, which claims priority to the referenced U.S. patent application.

* cited by examiner

*Primary Examiner* — Lashonda Jacobs
(74) *Attorney, Agent, or Firm* — Ostrager Chong Flaherty & Broitman P.C.

(57) ABSTRACT

A method and apparatus for three-dimensional image viewing of an image display employs a pair of viewing glasses having left and right side lenses for alternate left-eye and right-eye image viewing by alternately blocking and passing left and right-eye image views from the image display. An image monitor is used to detect lens sync control information interleaved or embedded with image frames of the image display. The lens sync control information detected by the image monitor is decoded into left and right lens control signals for alternately blocking and passing of left and right-eye image views by the left and right side lenses, respectively, in order to generate three-dimensional image viewing.

16 Claims, 4 Drawing Sheets

METHOD AND APPARATUS FOR 3D VIEWING

TECHNICAL FIELD

This disclosure generally relates to a method and device for Three-dimensional (3D) viewing, and particularly, in which viewing glasses having left and right-eye shutter lenses are used.

BACKGROUND

Three-dimensional (3D) or stereoscopic images have been widely used in video gaming, virtual reality systems, and other 3D display systems. 3D viewing glasses are typically used as the simplest and most convenient mode for users to view 3D images. In general, they use shutter lenses so that the viewer's eyes alternately see left and right-eye image views that are perceived in the brain as a 3D image. For example, 3D Viewing Technologies, Inc., of Miami, Fla., provides the Virtual FX™ System which receives an ordinary video signal from a DVD, video player, cable box or game console, and converts it to a 3D video signal (i.e. superimposed left and right image views) that is displayed on the TV set. The image conversion is performed by standard mathematical algorithms which calculate separate and distinct left-eye and right-eye images displayed on the TV screen in an alternating format. A pair of 3D shutter glasses is used which receive an infrared signal transmitted from the converter box to render the left and right lenses alternately transparent and opaque in sync with the TV displayed image so that the right image is seen by the right eye, and the left image by the left eye, thus producing a stereographic 3D image. There are several lensing methods for blocking/passing views to the human eye, for example, double layer crossed polarized lenses or electronically controlled polarization shutter lenses.

The control information for 3D shutter lenses is synchronized with the display, usually by using the sync signal of the display. The sync signal is an ordered sequence of pairs, rather than a stream of identical signals. In other systems, it may be an ordered sequence of quad signals, with 2 successive sync pulses, for the 2 fields of a single video frame, keeping the same eye viewing. Advanced computer systems, particularly from Sun Microsystems and Silicon Graphics have used this form of stereo capability.

The computational methods for generating right and left stereoscopic images from given image data are well known, for example, as described in "3d Stereo Rendering Using OpenGL (and GLUT), by Paul Bourke, November 1999, available at the Internet page addressed as http://astronomy.swin.edu.au/pbourke/opengl/stereogl/. The method of determining the right and left eye offset and computing corresponding left and right eye images has become a standard in the industry.

Some popular 3D video games are created with 3D vision capability a common Application Programming Interface (API) for handling the 3D rendering and display functions of the game. The API drivers generate right and left stereoscopic image outputs to right and left stereoscopic display cards that generate the resulting 3D stereoscopic display "Stereo vision" is obtained by delivering appropriate right and left offset images to the user's right and left eyes through a suitable 3D shutter glasses, 3D display, VR goggles, or "no glasses required" 3D monitor. Examples of common API formats used for PC games include Glide™, developed by 3dfx Interactive, Inc., of Alviso, Calif., OpenGL™, developed by Silicon Graphics, Inc., of Mountain View, Calif., and DirectX™, distributed by Microsoft Corp., of Redmond, Wash.

The prior 3D viewing systems using viewing glasses have had the problem that a specialized piece of equipment, the converter/synchronization box, is required to sync with the display image and transmit the glasses sync control information to the viewing glasses. It is deemed desirable to eliminate this extra piece of equipment and have the viewing glasses handle control of alternate left and right-eye image viewing. This would allow the viewing glasses to be used for all similar images sources, rather than having a special converter/synchronization box for each type of images source.

SUMMARY

In accordance with a preferred embodiment, an apparatus and method for 3-D viewing of left and right-eye images from an image display source includes a pair of viewing glasses having left and right side lenses for alternate left-eye and right-eye image viewing by alternately blocking or passing images from the image display source, and a built-in image monitor lens or sensor which detects lens sync control information interleaved or embedded with the images from the image display source. An on-board decoder decodes the lens sync control information from the built-in image monitor lens into left and right lens control signals that are used to control blocking and passing of image views by the left and right lenses, respectively, in order to generate 3D image viewing.

The sync control information may be embedded in a set portion of the image display, such as a border portion bordering the image field. Alternatively, it may be embedded in frames that are interleaved with the image frames. The sync control information is detected by a decoder circuit coupled to the built-in image monitor lens as pulses and converted into a digital signal by an associated timing and logic circuit. The digital signal provides the lens commands to turn the right and left shutter glasses lenses on/off. A wide angle image monitor lens can be used with a very narrow band light filter in conjunction with a high amplification phototransistor in order to reduce noise from ambient light sources. The 3D viewing method and associated glasses with built-in image monitor and on-board decoder can thus decode the lens sync control information for left and right-eye image viewing without the need for any added converter or synchronization equipment to be used with the image display device. The viewing glasses can be used for 3D viewing on all types of images sources, and does not require a special converter/synchronization box for each type of image source.

Other objects, features, and advantages of the various embodiments will be explained in the following detailed description with reference to the appended drawings.

DETAILED DESCRIPTION

In the following detailed description, certain preferred embodiments are described in a specific application or environment in order to provide a thorough understanding of the disclosure. Those methods, procedures, components, or functions which are commonly known to persons of ordinary skill in the field are not described in detail as not to unnecessarily obscure a concise description of the disclosure. Certain specific embodiments or examples are given for purposes of illustration only, and it will be recognized by one skilled in the art that the disclosure may be practiced in other analogous applications or environments and/or with other analogous or equivalent variations of the illustrative embodiments.

Figure 1A:
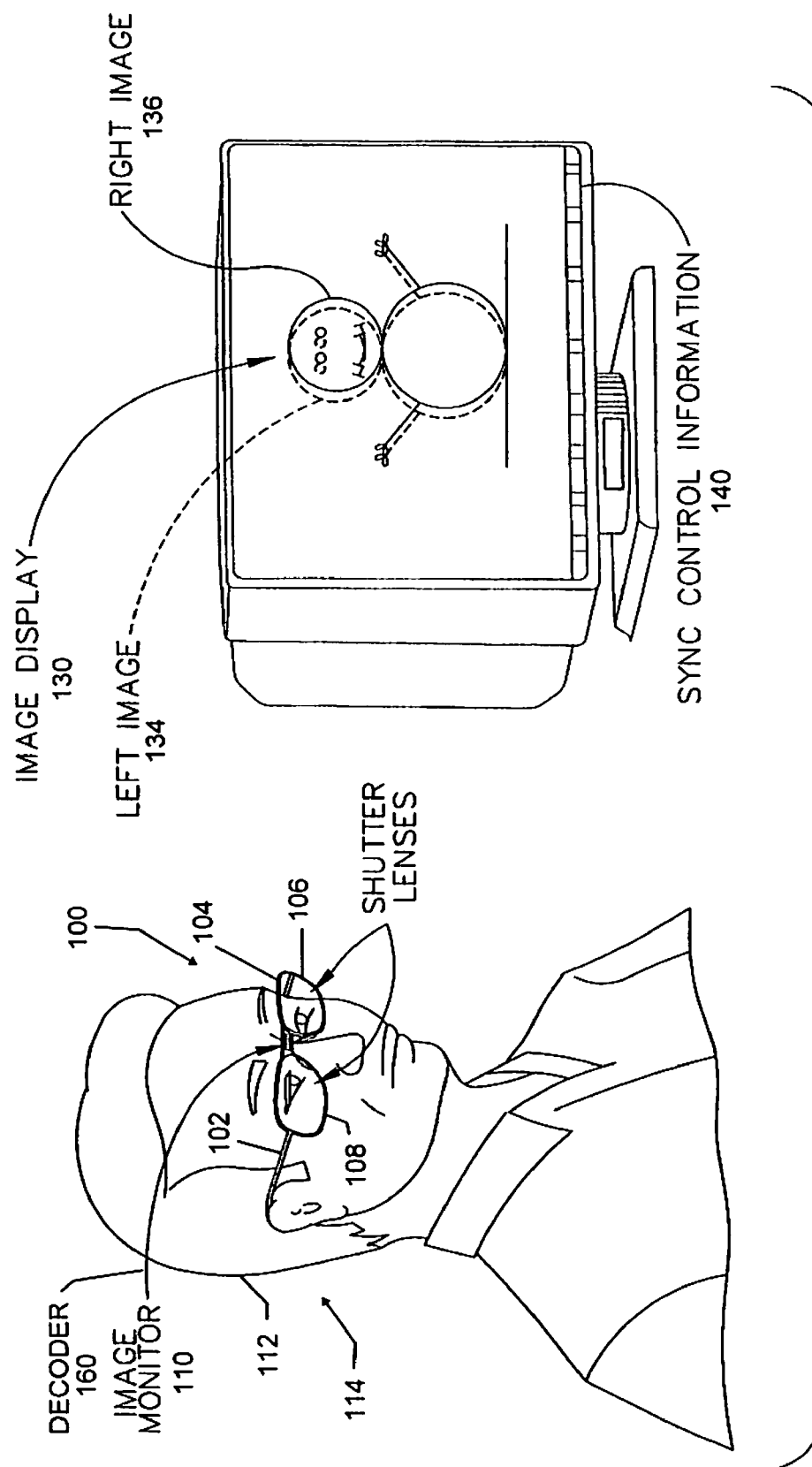
FIG. 1A shows an illustrative embodiment in which a pair of shutter glasses worn by a user has a built-in image monitor for imaging left/right lens sync control information embedded with an image display to control the 3D shutter lenses.

Referring to FIG. 1A, an illustrative embodiment 100 is depicted in which a pair of shutter glasses 102 includes a glasses frame 104 that has a built-in image monitor 110, such as a camera with a lens, for imaging left/right lens sync control information 140 embedded in or interleaved with the image display frames. Each left 106 and right 108 shutter glasses lens can be controlled using the sync control information 140 to either block or pass the respective left 134 and right 136 images (L Image, R Image) from the display. The display is updated for each frame of left/right images. The sync control information for the receiving glasses is displayed either in a dedicated zone (e.g., the lower border in the figure) in each frame or in sync control frames interleaved with the image frames. The sync control information is used for switching the respective left/right shutter glasses lenses on/off to generate 3D images for viewing. The built-in image monitor in the glasses scans the sync control information displayed on the image display, and the scanned image is decoded as sync control information by an on-board processing circuit that is embedded in the shutter glasses frame.

The sync control information can be imbedded in a part of the image display that borders the image field and can be made so small that the human eye will not notice it. One or two scan lines on the image display can have the sync control information in a set location bordering the image display. When decoded, the sync control information controls the viewing glasses such that it blocks or passes the image to the left/right viewer's eye which in turn gives the viewer a 3D effect.

Figure 1B:
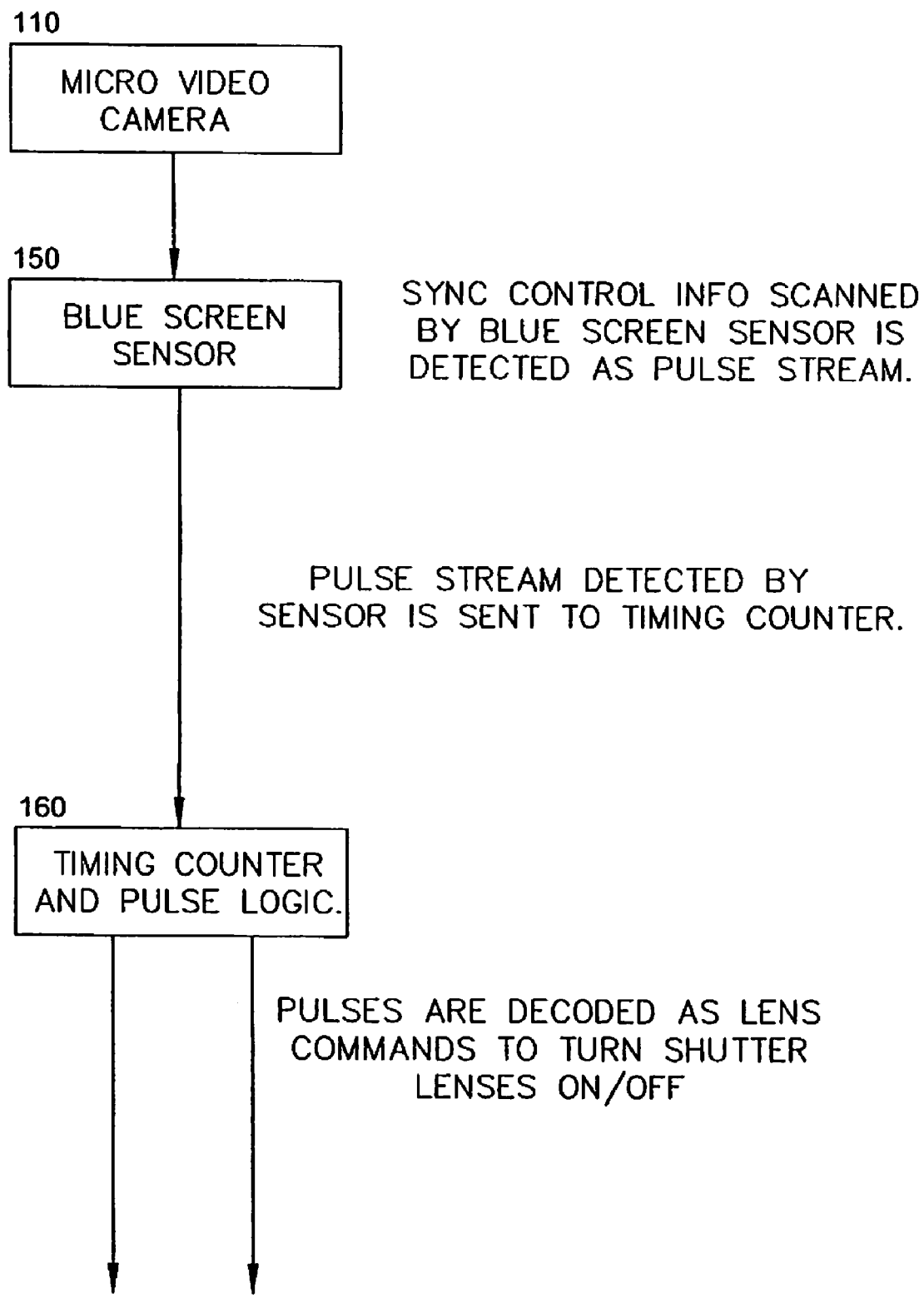
FIG. 1B shows an example of a decoding circuit for converting the scanned information embedded or interleaved in the image display to sync control information for the shutter glasses.

Referring to FIG. 1B, an example of the decoding circuit is illustrated. The built-in image monitor of the glasses can be a micro video camera 110 with a blue screen sensor 150 that scans the portion of the image display where the sync control information is embedded. The sync control information can be in the form of visual bars scanned as pulses. The pulse trains scanned from the blue screen are provided to a timing and logic circuit 160 which detects the pulse size/duration and converts them into a digital signal. The digital signal provides the lens commands to turn the lens on/off. One line of pulses can be used per lens. The decoder logic can wait for at least two pulses in the expected sequence to start the timing counter to start the detection of the following pulse train.

In the above-described manner, the image display source would provide both the "control" information as well as the "normal" image frames. The sync control information would control each left/right lens to view the respective left/right images on the image display. Each shutter glasses lens is controlled on/off to pass/block light transmission from the image display at relatively high rates of switching. For example, the human brain detects flash images of about 1/30-second intervals or faster as smooth motion. The left/right image switching rate may be higher as long as it does not bother the viewer. The timing between successive sync signals establishes the blocking speed of the lenses. If the sync control image is embedded in frames that are interleaved with image frames, then both lenses need to be switched off during image display of the control information frames. The pulse decoder circuit embedded in the glasses timing would be supplied by an on-board power source, such as a small battery. The display images are "preprocessed" to insert the sync control information using suitable API routines as is commonly used to generate 3-D images from 2-D video content. This method can be ported for all 3-D images viewable on any image display source, such as computer monitors, TV monitors and movies/films.

Figure 2:
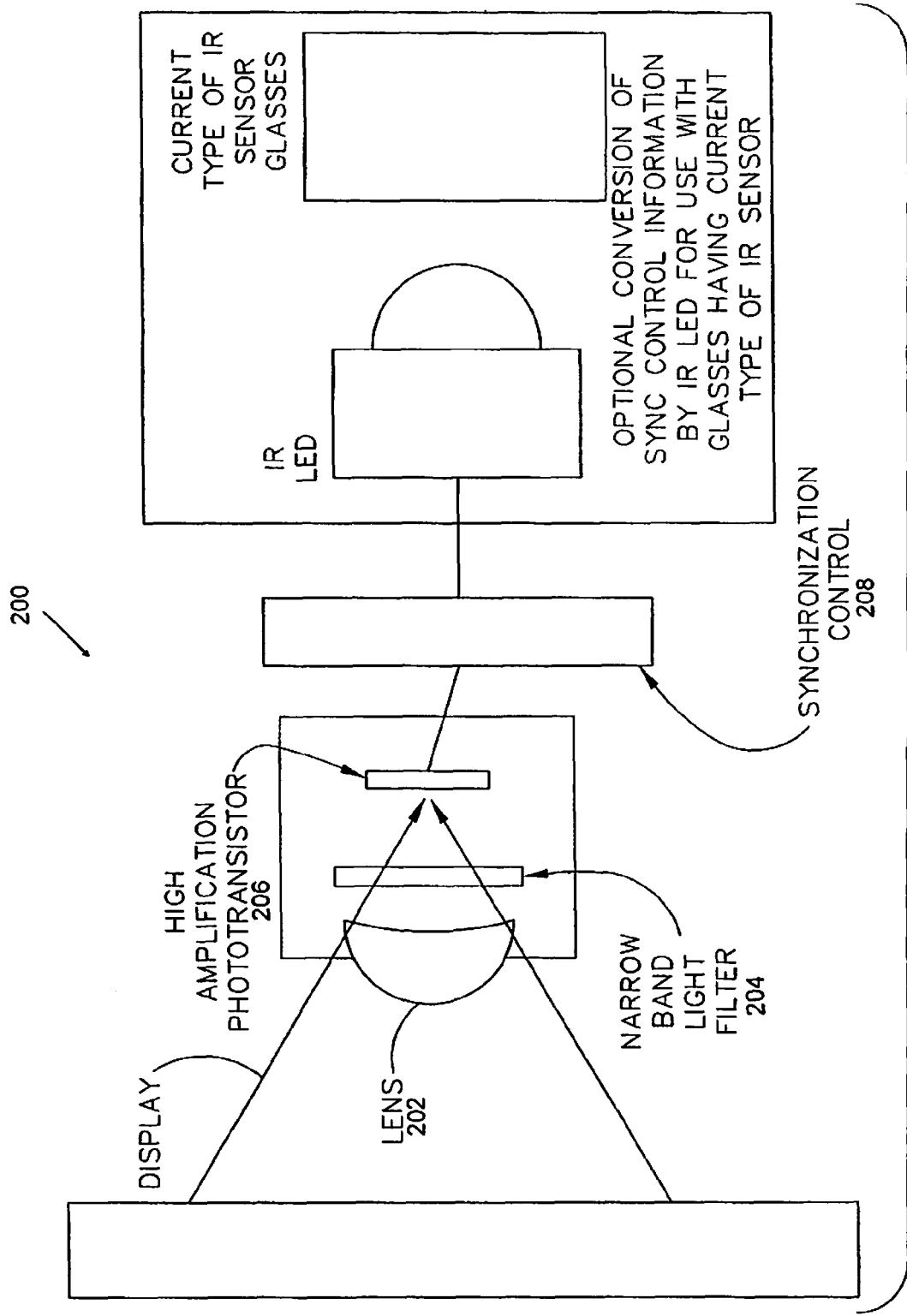
FIG. 2 shows an example of an image monitor lens and circuit for the shutter glasses.

Referring to FIG. 2, an exemplary embodiment 200 of an image monitor lens and circuit for the shutter glasses 100 is illustrated. A wide angle lens 202 (small thick lens close to sensor) can be used with a very narrow band light filter 204 in conjunction with a high amplification phototransistor 206. The narrow band light filter may be incorporated into the lens. The wide angle lens is non-image focusing. The narrow band filter drastically reduces the noise from ambient light sources. The sync control artifact may consist of a localized spot of specific light wavelength but more likely the artifact may be a coloration of the entire screen of narrow wavelength which coincides with the wavelength transmitted by the narrow band filter between the lens and the phototransistor sensitive surface. The glasses may incorporate a filter which severely attenuates the color of the artifact such that the background color is not perceived by the observer. The sync control image scanned by the image monitor lens is sent to a synchronization control circuit 208 (described below) for generating the left/right lens command signals. The right side of the figure shows an optional IR LED circuit for converting the sync control information to IR signals by IR LED for use with a conventional type of shutter glasses having a sensor responsive to IR signals.

Figure 3:
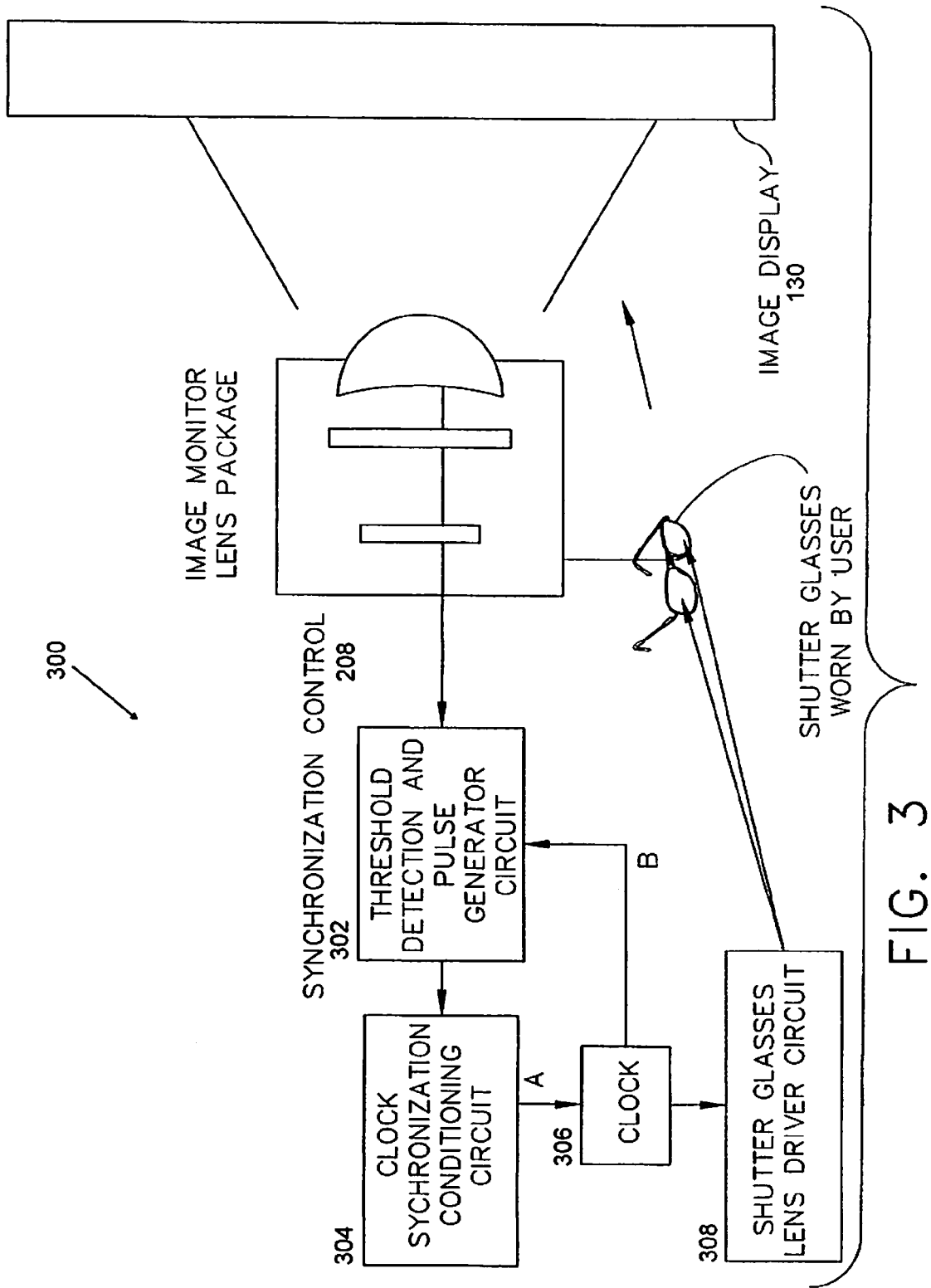
FIG. 3 shows an example of a synchronization control circuit for the shutter glasses.

In FIG. 3, an exemplary embodiment 300 of a synchronization control circuit for the shutter glasses 100 is shown having a Threshold Detection and Pulse Generator Circuit 302 which detects a leading pulse scanned by the Image Monitor Lens as a peak analog electrical pulse. It continuously detects and compares the most current maximum signal with the previous maximum signal demarcated by the time intervals fed to this Threshold Dectection Circuit by the clock signal B fed by the Clock as a reference interval. This maximum signal is conditioned by Clock Synchronization Conditioning Circuit 304 and used to update the clock phase 306 by feedback signal A taking into account all circuit latencies including the Threshold Detection Circuit and the Shutter Glasses Lens Driver Circuit 308. The Clock provides the updated clock signal to synchronize the generation of lens command signals with the display of frames on the Image Display. On the occasion that the Image Monitor Lens may lose its signal, the Clock will continue to drive the Shutter Glasses Lens Driver Circuit until sensor synchronization can resume. The Shutter Glasses Lens Driver Circuit generates the left/right lens command signals for synchronizing the turning on/off of the left/right lenses of the glasses worn by the user with the display of frames in the Image Display.

The field of view of the wide angle lens, whose function is to detect the artifact for synchronization purposes, should be wide enough to allow head movement within the angular bounds to which three dimensional viewing is possible. Again, the artifact can cover the entire screen by causing each display 'pixel' to contain the wavelength to which the synchronization sensor is sensitive. The synchronization sensor maintains its own internal clock which is synchronized to the display artifact as the display artifact signal is available. In the absence of the display artifact signal the previous timing is maintained by the internal clock until the artifact signal is again acquired at which point the internal signal synchronization is adjusted as required.

The glasses synchronization is based on a video rate artifact which is detected at a video frame rate and synchronizes an oscillator which in turn controls polarization of each eye of the glasses. Whatever lag is present is calibrated into the algorithm which is executed in custom electronic circuit and may be implemented using a Field Programmable Gate Array (FPGA) type polarization control circuit.

Many modifications and variations may of course be devised given the above description. It is intended that all such modifications and variations be considered as within the spirit and scope of this disclosure, as defined in the following claims.

What is claimed is:

1. An apparatus for three-dimensional image viewing of an image display, comprising:
    a pair of viewing glasses having a glasses frame, and left and right side lenses for alternate left-eye and right-eye image viewing by alternately blocking and passing left and right-eye image views from the image display;
    an image monitor built in with the glasses frame which is configured to detect lens sync control information included within image frames viewed on the image display, the image monitor comprising a wide angle lens used with a narrow band light filter in conjunction with a high amplification phototransistor in order to reduce noise from ambient light sources, the sync control information being selected from the group consisting of a localized spot of specific light wavelength and a coloration of the image frame of narrow wavelength which coincides with a wavelength transmitted by the narrow band light filter, the sync control information being detected by the image monitor as pulses that are converted into a digital signal by an associated timing and pulse logic circuit; and
    a decoder built in with the glasses frame configured to receive the lens sync control information and provide left and right lens control signals for alternately blocking and passing of left and right-eye image views by the respective left and right side lenses to provide the perception of three-dimensional image viewing to a user.

2. The apparatus of claim 1, wherein the sync control information is embedded in a set portion of image frames of the image display.

3. The apparatus of claim 1, wherein the sync control information is embedded in frames interleaved with image frames of the image display.

4. The apparatus of claim 1, wherein the decoder is integrated with the image monitor provided on the glasses frame.

5. The apparatus of claim 1, wherein the built-in image monitor is a micro video camera with a blue screen sensor that scans a portion of the image frames containing the lens sync control information.

6. The apparatus of claim 1, wherein the sync control information is a background coloration of the image frame and the apparatus further comprises a filter for attenuating the background coloration of the image frame such that the sync control information is not perceived by an observer.

7. The apparatus of claim 1, wherein the timing and pulse logic circuit continually detects a leading pulse scanned by the built-in image monitor as a peak analog electrical pulse, and compares the leading pulse to a previously detected leading pulse demarcated by time intervals fed to the timing and pulse logic circuit by a clock signal.

8. The apparatus of claim 1, wherein the image monitor maintains its own internal clock, the internal clock being synchronized to the lens sync control information as the lens sync control information is available.

9. A method for three-dimensional image viewing of an image display comprising:
    providing a pair of viewing glasses having left and right side lenses for alternate left-eye and right-eye image viewing by alternately blocking and passing left and right-eye image views from the image display;
    using an image monitor built into the glasses to detect lens sync control information selected from the group consisting of a localized spot of specific light wavelength and a coloration of the image frame of a narrow wavelength which coincides with a wavelength transmitted by the narrow band light filter as pulses interleaved with or embedded within image frames of the image display;
    using an associated timing and pulse logic circuit to convert the pulses into a digital signal; and
    using a decoder built into the glasses to decode the lens sync control information detected by the image monitor into left and right lens control signals for alternately blocking and passing of left and right-eye image views by the left and right side lenses, respectively, in order to generate three-dimensional image viewing.

10. The method of claim 9, wherein the sync control information is embedded in a set portion of the image frames of the image display.

11. The method of claim 9, wherein the sync control information is embedded in control frames that are interleaved with the image frames of the image display.

12. The method of claim 9, wherein the decoder is integrated with the image monitor built into the glasses.

13. The method of claim 9, wherein the image monitor includes a wide angle lens used with a narrow band light filter in conjunction with a high amplification phototransistor in order to reduce noise from ambient light sources.

14. A glasses device for three-dimensional image viewing of an image display, comprising:
    a glasses frame;
    left and right side lenses carried on the glasses frame for alternate left-eye and right-eye image viewing by alternately blocking and passing left and right-eye image views from the image display;
    an image monitor built in with the glasses frame which is configured to detect lens sync control information included within image frames viewed on the image display as pulses that are converted into a digital signal by an associated timing a pulse logic circuit, the image monitor comprising a wide angle lens used with a narrow band light filter in conjunction with a high amplification phototransistor in order to reduce noise from ambient light sources, the timing and pulse logic circuit continually detecting a leading pulse scanned by the image monitor as a peak analog electrical pulse, and compares the leading pulse to a previously detected leading pulse demarcated by time intervals fed to the timing and pulse logic circuit by a clock signal; and
    a decoder integrated with the image monitor built in with the glasses frame which is configured to receive the lens sync control information and provide left and right lens control signals for alternately blocking and passing of left and right-eye image views by the respective left and right side lenses to provide the perception of three-dimensional image viewing to a user.

15. The glasses device of claim 14, wherein the sync control information is embedded in a set portion of image frames of the image display.

16. The glasses device of claim 14, wherein the sync control information is embedded in frames interleaved with image frames of the image display.

* * * * *